United States Patent
Rose

[11] Patent Number: 5,534,867
[45] Date of Patent: Jul. 9, 1996

[54] OPEN LOOP COUNTERMEASURE TO PASSIVE DIRECTION FINDING AND LOCATION OF RADAR TRANSMITTERS USING DOPPLER TECHNIQUES

[75] Inventor: Conrad M. Rose, Dahlgren, Va.

[73] Assignee: Litton Systems, Inc., Woodland Hills, Calif.

[21] Appl. No.: 491,597

[22] Filed: Jun. 16, 1995

[51] Int. Cl.⁶ .................................................. G01S 7/36
[52] U.S. Cl. ............................................. 342/17; 342/18
[58] Field of Search .................................. 342/13, 16, 17, 342/18, 19

[56] References Cited

U.S. PATENT DOCUMENTS

| | | | |
|---|---|---|---|
| 3,702,476 | 11/1972 | Nathanson et al. | 342/195 |
| 3,720,952 | 3/1973 | Lawsine | 342/15 |
| 3,891,989 | 6/1975 | Barney et al. | 342/201 |
| 4,068,235 | 1/1978 | Peters, Jr. et al. | 342/15 |
| 4,072,944 | 2/1978 | Bianco et al. | 342/16 |
| 4,257,108 | 3/1981 | Igel | 364/900 |
| 5,241,313 | 8/1993 | Shaw et al. | 342/13 |
| 5,315,307 | 5/1994 | Tsui et al. | 342/444 |

*Primary Examiner*—John B. Sotomayor
*Attorney, Agent, or Firm*—Gerald L. Lett

[57] ABSTRACT

A method and apparatus for controlling the output characteristics of a radar emitter for thereby preventing the location of the emitter using Doppler techniques. The emitter's RF frequency and PRF are under the control of a random signal generator which causes the emitter to emulate common signal corrupting influences.

6 Claims, 5 Drawing Sheets

OPEN LOOP COUNTERMEASURE TO PASSIVE DIRECTION FINDING AND LOCATION OF RADAR TRANSMITTERS USING DOPPLER TECHNIQUES

BACKGROUND OF THE INVENTION

This invention relates to radar electronic counter-counter measure systems (ECCM). It is particularly concerned with the defeat of sensitive electronic surveillance measure (ESM) intercept receivers attempting to locate the radar in angle or range, especially while outside the maximum useful detection range of the radar, by comparing measured Doppler shifts in the radar's signal.

In connection with this invention "open loop" refers to the fundamental assumption that the ESM system has detected the radar, but the radar has not detected the observer. Since the radar is not tracking the observer attempting passive Doppler location, closed loop countermeasure are not available, where "closed loop" refers to the feedback of target range, speed and heading information to the passive Doppler ECCM system.

The following United States patents are representative of the passive Doppler approaches ESM systems may use, and which this invention will defeat: Shaw et al U.S. Pat. No. 5,241,313 "Angle of Arrival Measurement via Time Doppler Shift" and Tsui et al U.S. Pat. No. 5,315,307 "Doppler Frequency Angle Measurement Technique". These Doppler techniques may be used against pulsed-echo radars.

Techniques exist that confuse a radar receiver attempting to make relative time-of-arrival (TOA) Doppler measurements from received rf pulses. False target signals are generated by receiving the radar signal, varying the relative pulse timing of the signal, and then retransmitting the signal. For example, Barney et al in U.S. Pat No. 3,891,989 "Radar Confusion Countermeasure System" transmit a pulse train identical to those received from the radar in pulse width and frequency, but with random time relationships with respect to the received pulses.

Should it be attempted to use the foregoing techniques for ECCM purposes, ECM techniques such as those described in the Barney patent have severe drawbacks. Although adding pulse groups randomly and thus jittering the pulse repetition interval (PRI) would make estimating pulse time-of-arrival (TOA) difficult in the Shaw TOA passive Doppler approach, the pulse repetition interval ("PRI") of an existing radar cannot be randomly altered without changing performance or requiring extensive modifications in processing. To avoid this possible performance degradation and costly equipment change, as well as to avoid possible detection of the counter measure by a pulse deinterleaver in the ESM system, it is desirable to avoid altering the relative position of the pulses in a frame repetition interval (FRI) (FIG. 3) below. Therefore the fundamental pulse repetition frequency, or PRF, must be jittered instead, and this alteration must be done in a manner that does not change PRI processing.

Altering the PRF, however, does not affect an RF frequency Doppler technique such as described in the Tsui patent which could be used in conjunction with the time based technique to check for such countermeasures.

To defeat Tsui's approach the RF carrier frequency must be modulated. Frequency agility is currently used to prevent countermeasures against radar, e.g. such countermeasures as described in the Barney patent. For instance Peters, Jr. et al in U. S Pat. No. 4,068,235 "Frequency Diversity Radar System" describes a method for varying the interpulse frequency of the magnetron in a pulsed oscillator radar.

But as an ECCM technique against passive frequency Doppler measurements, varying interpulse frequency will not work unless the changes in RF frequency are correlated with the PRF changes. Otherwise the presence of frequency modulation can be detected by comparison with a TOA based passive Doppler measurement technique such as Shaw's.

SUMMARY OF THE INVENTION

An object of this invention is to provide a method and apparatus for preventing passive DF and location of the transmitter using passive Doppler techniques. Use of the invention requires no modification whatsoever in current signal design approaches used to achieve radar system performance goals such as probability of detection, target range and speed measurement accuracy, or ECCM. In particular it makes no changes to the relative integer spacings in the existing PRI structure within a frame repetition interval or FRI (FIG. 3), but only alters PRF or RF at the beginning of a new FRI, and only after all previously transmitted pulses have been received.

Another object of this invention is to provide means and method which utilize the fact that the radar requires reference oscillator coherence only over the time required for a pulse round trip, i.e. only over milliseconds, whereas Doppler passive location methods compare multiple changes in signal Doppler resulting from observer attitudinal and translational position changes, and hence require signal coherence over seconds.

Still another object of this invention is to provide method and apparatus which exploit the fact that the Doppler induced change measured by an observer attempting to perform ESM location on the radar is not dependent on the observer's range from the emitter, but only on the observer's velocity and relative heading, and that this Doppler change is only estimated to an accuracy that neglects terms involving $v^2/c^2$, or higher powers of $1/c$, where c is the speed of light. Thus it is not necessary for the radar to have detected and ranged on the observer in order to disrupt the observer's Doppler measurements.

With the accuracy of the Doppler measurements disrupted, the comparison of the Doppler shifted signal measurements made at different observer locations or with different observer headings will yield spurious results. That is, the information in the change of the Doppler shift, from which emitter angular and range location is derived, will be destroyed.

Yet another object of this invention is to provide mean and method which make use of the fact that the change in the Doppler shift the observer is attempting to measure is only, at the most, several hundred Hertz if RF carrier Doppler is being used, and fractions of a Hertz if time, or equivalently, PRF Doppler techniques are employed. Therefore the frequency changes in the radar required to prevent the passive extraction of correct Doppler changes are small compared to the RF and PRF frequencies the radar employs. Thus modulating these frequencies represents only a small perturbation to the normal operating frequencies used by the radar, and need not alter the operational use of the radar, or its performance if the perturbation is correctly done.

To create these perturbations, this invention varies a reference oscillator frequency in a manner that destroys the passive Doppler information, but is not observable as a modulated signal to the user of the passive Doppler based DF and location technique. That is, according to the invention the radar signal is altered such that the effect it produces at the ESM receiver and processor cannot statistically be distinguished from common signal corrupting influences such as multipath, pulse-on-pulse collisions, or low SNR. To completely achieve this aim it is most desirable to jitter or modulate both frequency and PRI in concert, as described in the derailed description of this invention.

The properties of the perturbing signal, and its effect, are derived as follows.

The signal parameter measured in passive frequency Doppler location is $$f = f_0 \left[ \left( 1 - \frac{\vec{v} \cdot \vec{u}}{c} \right) \right]^{-1} \quad (1a)$$

while for TOA passive Doppler the signal measured ultimately is $$t_p = t_{po} \left( 1 - \frac{\vec{v} \cdot \vec{u}}{c} \right) \quad (1b)$$

where $\vec{v}$ = observer velocity, $\vec{u}$ = emitter signal direction of arrival unit vector, $t_p$ = fundamental time-of-arrival difference being measured, $f_0$ = carrier rest frequency.

($t_p$ is $f_{prf}$ FIG. 1).

Time and frequency Doppler changes therefore involve an essentially reciprocal relation, and so only the effect on Equation (1a) arising from the proposed perturbations needs to be discussed. Although the following focuses on $f_0$, it is to be understood that the same perturbations are applied to $f_{prf}$ in the most desirable implementation of this invention.

As noted above, the radar requires reference oscillator coherence only over milliseconds, whereas Doppler passive location methods require signal coherence over seconds. Therefore the RF or PRF reference oscillator can be changed several times in the interval needed to DF the emitter without violating the radar coherence requirement.

The passive Doppler DF or location algorithm expects to see a signal of the form of Equation (1) for all its measurements. If $f_0$ (111, FIG. 1) changes during the Doppler estimation process according to $$f_0 \to f_0 \left( 1 + \frac{\Delta}{c} \right) \quad (2)$$

where $\Delta$ is of the order of typical observer speeds, then the signal actually measured is $$f_0 \left( 1 + \frac{\Delta}{c} \right) \left( 1 - \frac{\vec{v} \cdot \vec{u}}{c} \right)^{-2}$$

which to the relativistic approximation commonly used, and used consistently here, is $$f_0 \left( 1 - \left( \frac{\Delta}{c} - \frac{v \cdot u}{c} \right) \right) \quad (3)$$

Thus $\Delta/c$ appears as a Doppler shift, and can be chosen to either completely mask the true Doppler shift, or to subtly perturb it so that the presence of the frequency offset is unobserved. This subtle perturbation is preferred and requires frequency offsets on the order of 1 kHz for a 10GHz rf carrier frequency, and about 1 Hz for a 2 MHz PRF.

To further mask the fact that frequency shifts $f_0\Delta/c$ are perturbing the rest frequency $f_0$, these frequency shifts must be statistically generated to simulate the occurrence of multipath due to random scatterers, pulse-on-pulse collisions, and low signal-to-noise ratio. To simulate these effects a Markovian random process should be used. A convenient random process that produces the correct observed statistics is the generalized random telegraph signal $$\frac{\Delta}{c} = a(-1)^{n(t_2, t_1)} \quad (4)$$

where $n(t_2, t_1)$ = Poision process distributed events, a = random variable having an arbitrary distribution.

This process has the desirable characteristics that the mean of the process is $$\left\{ \frac{\Delta}{c} \right\} = \langle a \rangle$$

while the temporal correlation is $$\left\{ \frac{\Delta}{c}(t_1) \frac{\Delta}{c}(t_2) \right\} = \langle a^2 \rangle e^{-\nu|t_2 - t_1|} + \langle a \rangle^2 (1 - e^{-\nu|t_2 - t_1|}).$$

So if the random distribution that generates a satisfies $$\{a^2\} = \{a\} \approx \frac{v}{c}$$

and the correlation time constant v is on the order of 0.25 second, random emitter angles will be generated from the measurements of either time or frequency Doppler shifts (FIG. 5).

As a means to detect these perturbations in time or frequency the observer could simultaneously use both a frequency Doppler technique such as in the Tsui patent on the RF carrier or a time-based technique such as in the Shaw patent on the PRF and compare results. To defeat this simple countermeasure it is desirable to perturb both the PRF reference oscillator and the RF carrier oscillator by the same Markovian signal. For a pulsed-amplifier radar such as commonly used in fire control there may be a common reference oscillator, so applying the same perturbation is easy. However, a more important application of this invention is in pulsed-oscillator radars (FIG. 1) that are used for target acquisition, since these radars transmit for long periods of time and so are good candidates for passive Doppler location. Therefore, the principles of this invention will be of discussed in the context of pulsed oscillator radars. These principles will be more readily understood by reference to the description of a preferred embodiment given hereinbelow in connection with the drawings which are briefly described in the following. In the figures like components are identified by the same reference numerals.

DETAILED DESCRIPTION OF THE DRAWINGS

Figure 1:
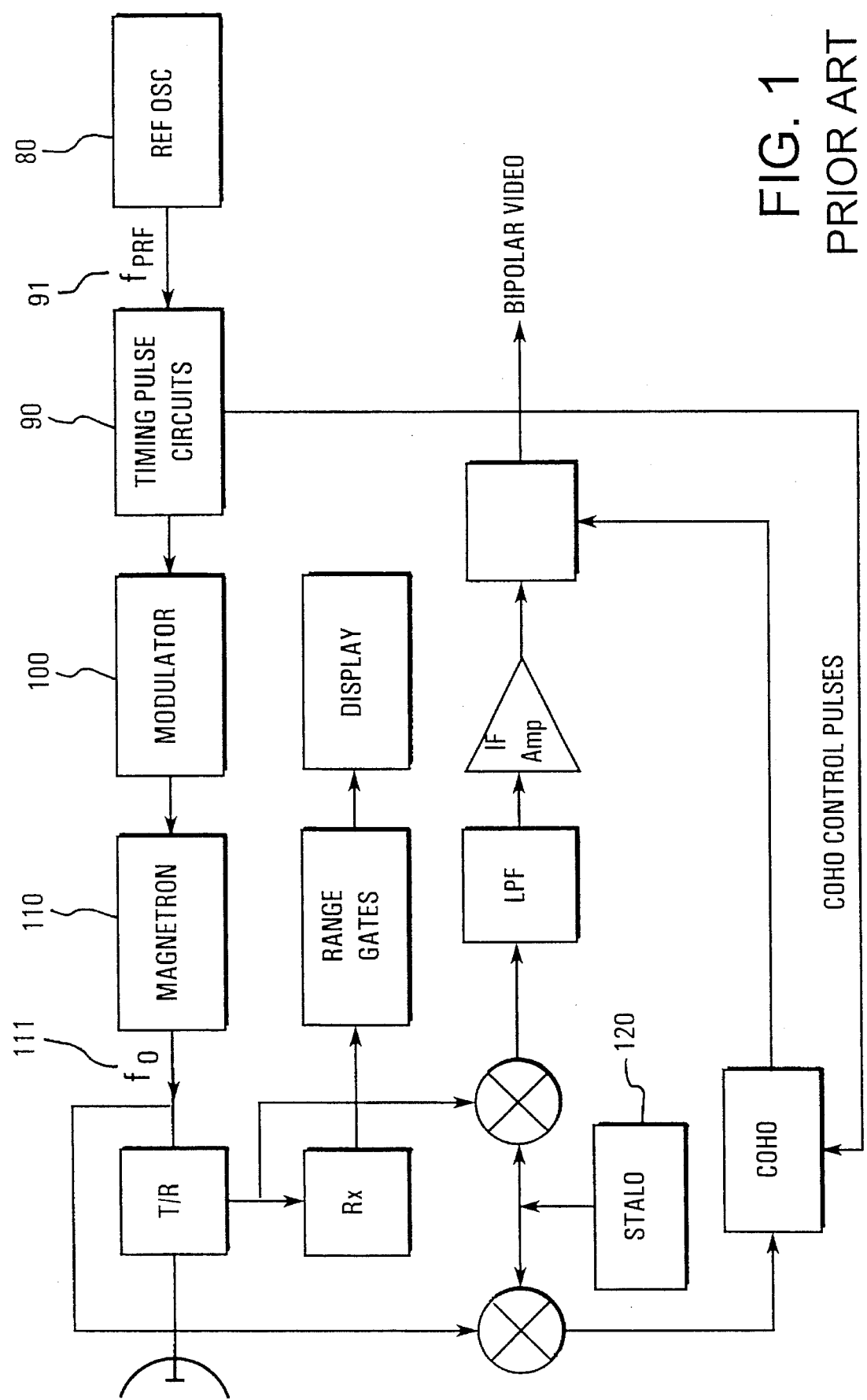
FIG. 1 is a block-schematic diagram of a pulsed oscillator radar representative of those used for target acquisition in surface-to-air missile (SAM) systems, and typical of the type of radar passive Doppler methods can be used against.

FIG. 1 illustrates a conventional pulsed oscillator radar of the type used for target acquisition in, e.g., in surface to air missile systems. As has been pointed out, this system produces radar signals of the type with which the aforementioned Doppler DF and emitter location techniques can readily be used.

This prior art radar system will not be described in greater detail at this point due to its well known structure and principles of operation. However, this system will be referred to in describing the relationship to it of the FIG. 2 embodiment of the invention.

Figure 2:
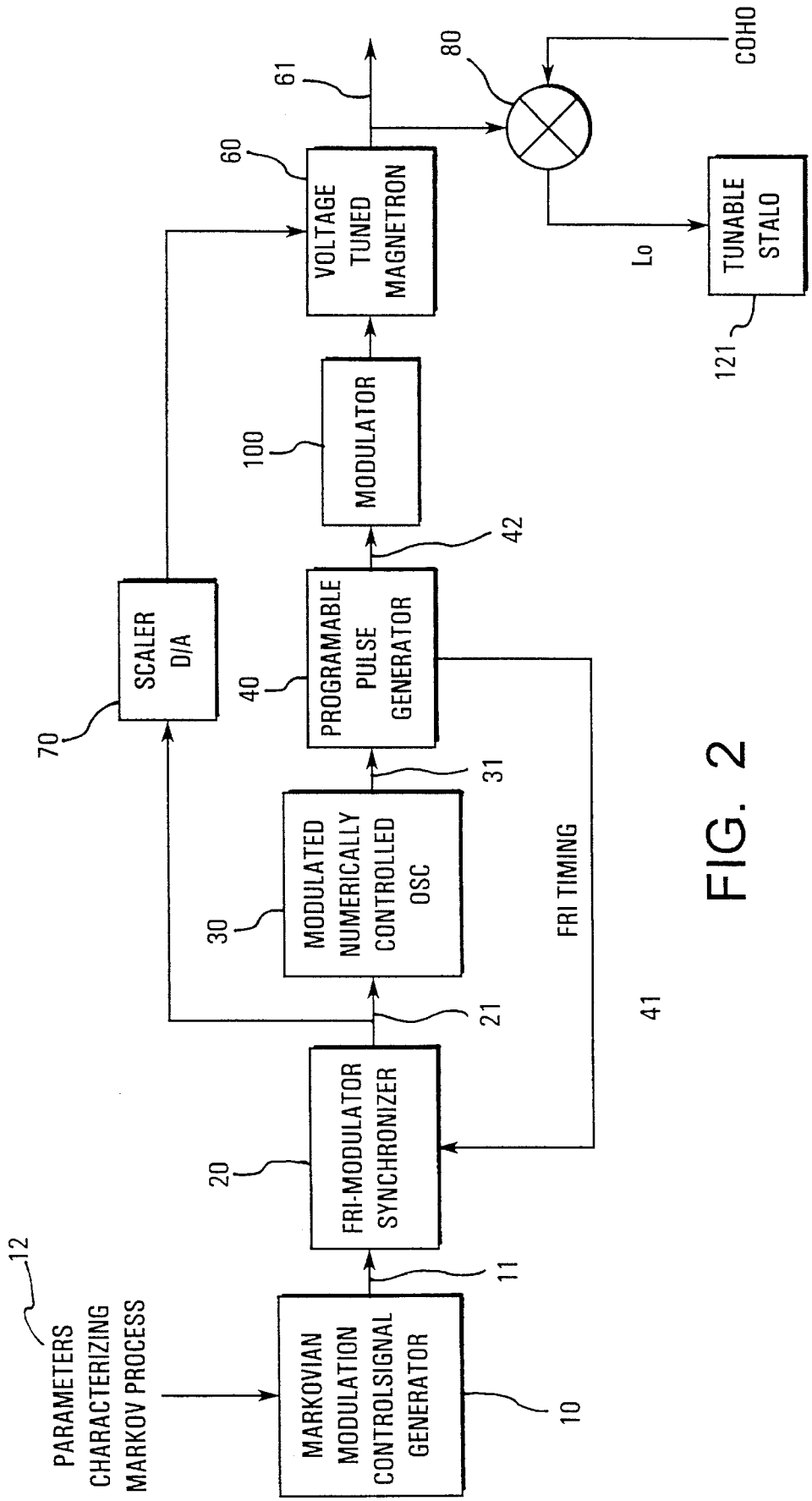
FIG. 2 is a block-schematic diagram of a preferred embodiment of modifications made to the FIG. 1 embodiment according to the invention to defeat passive emitter-locating Doppler methods.

FIG. 2 shows a preferred embodiment of the modifications made, according to the invention, to a prior art pulsed-oscillator radar as shown in FIG. 1. In the original system shown in FIG. 1, a magnetron 110, timing pulse circuits 90, reference oscillator 80 and stable local oscillator 120 are modified.

The function of the reference oscillator 80 is to provide the fundamental time interval $t_{po}$ from which the pulse timing, and in particular the PRF is derived. In the invention, this function is performed by a signal controlled oscillator (30, FIG. 2) where the signal may be either a digital word or voltage. An example of a suitable oscillator of the latter type is the Stanford Telecom model STEL-1175 60 MHz 32-bit CMOS modulated numerically controlled oscillator.

This oscillator can have its frequency changed or "pulled" with a 14 milli-Hz resolution. The frequency of the oscillator is set by a source, 10 and 20, of pulling control signals 21. The control signals have an amplitude variation that controls the PRF or RF frequency perturbations about the original operating frequencies. The magnitude of the control signal is constant until a switch signal based on the number of random events occurring in a preselected time interval triggers a change in magnitude. This number of discrete random events simulates at the ESM intercept receiver the effect of random discrete scatters in the signal path, or some other discrete signal-corrupting event. The new magnitude is drawn from a predetermined random distribution. The preferred form of this signal is that of a random telegraph process, Equation (4), since this Markovian process simulates many naturally occurring signal degrading effects such as multipath.

The control signal generation device 10 can be either a PROM with the previously generated signal stored in a memory look-up table, or a microcomputer that uses an algorithm to generate the signal in real-time. The PROM generated control signal must repeat after a certain time, and the resulting periodic pattern may be statistically detectable by an observer. Therefore the microcomputer implementing numerical algorithms to generate the random variables, and from them the signal, is preferred.

The control signal generation device 10 ultimately drives both the RF frequency source 60 and the RF pulse signal generator 40. The RF pulse signal generator, called "Timing Pulse Circuits" 90 (FIG. 1) in the original system, is replaced by the programmable and frequency controllable pulse generator 40 (FIG. 2). A suitable device is similar to that of Igel described in U.S. Pat. No. 4,257,108. The control frequency 31 from the reference oscillator 30, which varies randomly according to the pulling signal generated by 10, determines the basic pulse spacings generated by $t_{po}$ (FIG. 3) in this device. Hence changing the control frequency 31 alters these spacings in a manner that defeats pulse time-of-arrival Doppler passive DF, such as the method described in the Shaw patent. This change in control frequency must not cause random jitter in the relative time spacing between pulses within a frame, but rather must preserve the relative pulse spacings in a frame of pulses as determined by counts of $t_{po}$ in the manner illustrated by FIG. 3. When this is done it will not be possible for the ESM system to use a pulse deinterleaver to detect the presence of the changes in $t_{po}$. This is because deinterleavers generally derive the relative integer spacings between the pulses, e.g. N and M in FIG. 3, and these integer spacings will not change. Furthermore, when $t_{po}$ changes in response to the control signal 31, a blanking interval may have to be inserted to allow pulses transmitted with the old $t_{po}$ to return before a pulse train with the new to is transmitted.

Figure 4:
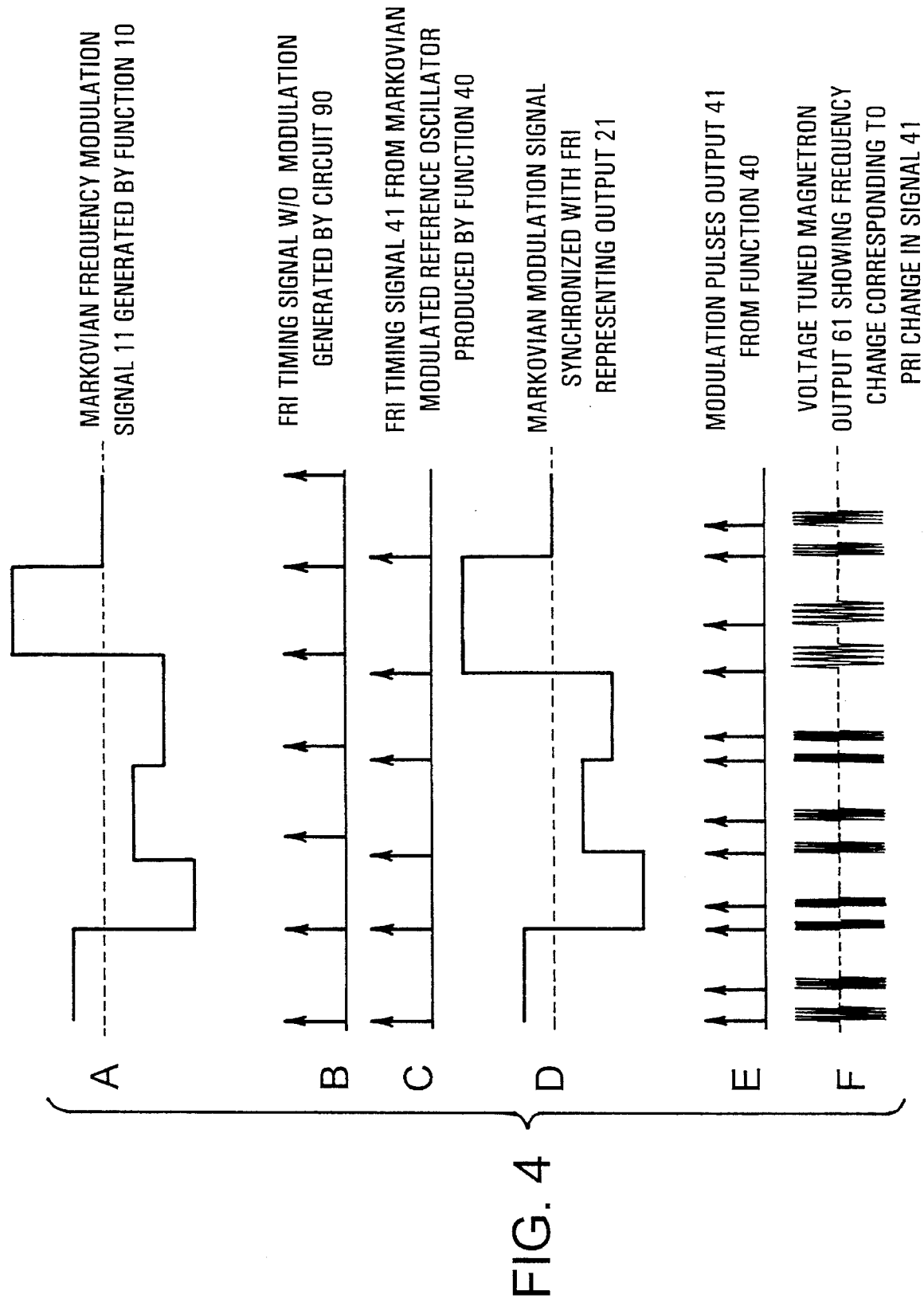
FIG. 4 is a waveform-time diagram showing the synchronization of the Markovian modulation control signal with the FRI time sequence, and the manner the RF and the PRF changes are correlated, according to the invention.

The Igel patented pulse generator has the means to insert this blanking interval; however means must be added to enable it by detecting the change in $t_{po}$. Also means must be added to adjust the Markovian control signal 11 amplitude switch times to synchronize with the FRI occurrence times, so that $t_{po}$ does not change during transmission of pulses in a frame. This is accomplished by the FRI-Modulator Synchronizer 20, which is a sequential logic device using well known techniques to synchronize the FRI timing signal 21 and Markovian control signal 41 in the manner shown in FIG. 4.

Figure 3B:
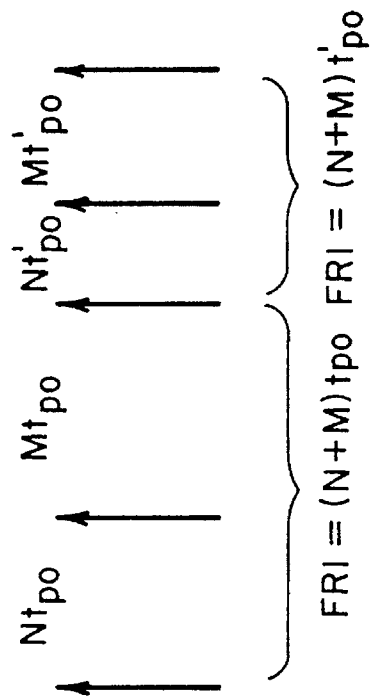
FIGS. 3a and 3b illustrate, respectively, a normal pulse train, and a pulse train modified according to this invention.
Figure 3A:
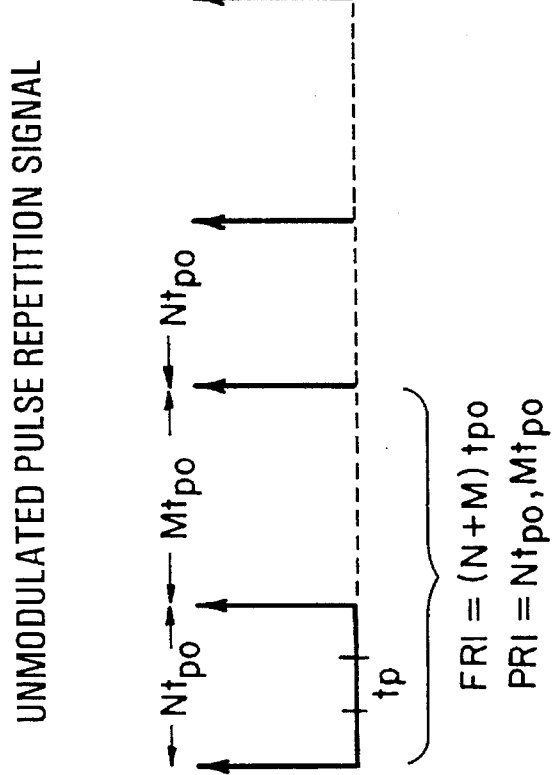

FIG. 4a shows the Markovian signal 11 with switching times and amplitudes determined by control inputs 12, FIG. 2. The frame timing signal used to generate the pulse train shown in FIG. 3a of the original system of FIG. 1 is shown in FIG. 4b. In the invention this timing signal is generated in the programmable pulse generator 40, and is modified in 40 according to the reference frequency input 31. The switching times of the Markovian signal 11 are adjusted in the FRI-modulator synchronizer to occur at the start of the closest FRI time marker 42. Such synchronization is a common task in digital circuit design, and is easy to accomplish. The resulting FRI-synchronized control signal shown in FIG. 4d causes the reference oscillator frequency 31 to vary in a manner that causes the pulse generator 40 to produce the pulse train shown in FIG. 4e. These pulses differ between frames as shown in FIG. 3b, preserving the integer spacings. The same control signal 21 that generated these pulses also changes the magnetron frequency as shown in FIG. 4f.

To obtain the variable rf frequency, the magnetron 100 (FIG. 1) is replaced by a voltage tuned magnetron (60 FIG. 2). This requires further system modifications as taught by Peters et al in U.S. Pat. No. 4,068,235. Specifically, the STALO 120 must be replaced by a tunable stable local oscillator 121. The local oscillator frequency is derived by mixing 80 the RF carrier with the IF from the COHO. As noted above, the same control signal 21 that drives the PRI control signal $t_{po}$ drives the voltage tuned magnetron. The control signal, which in this realization is output from 21 as a digital word, is converted to the correct control voltage in the digital-to-analog converter 50.

Figure 5A:
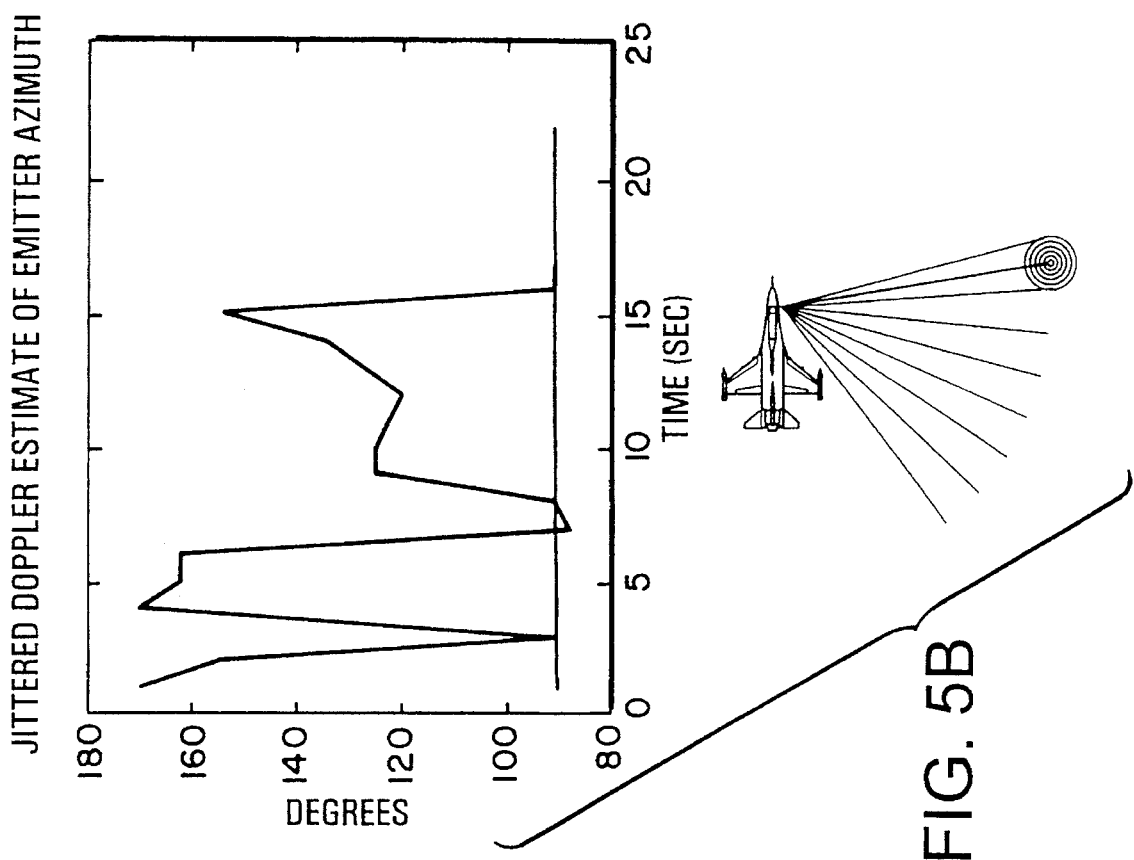
FIG. 5a illustrates angle estimation performance against the radar of FIG. 1 using a prior art method similar to that expounded by Shaw.
Figure 5B:
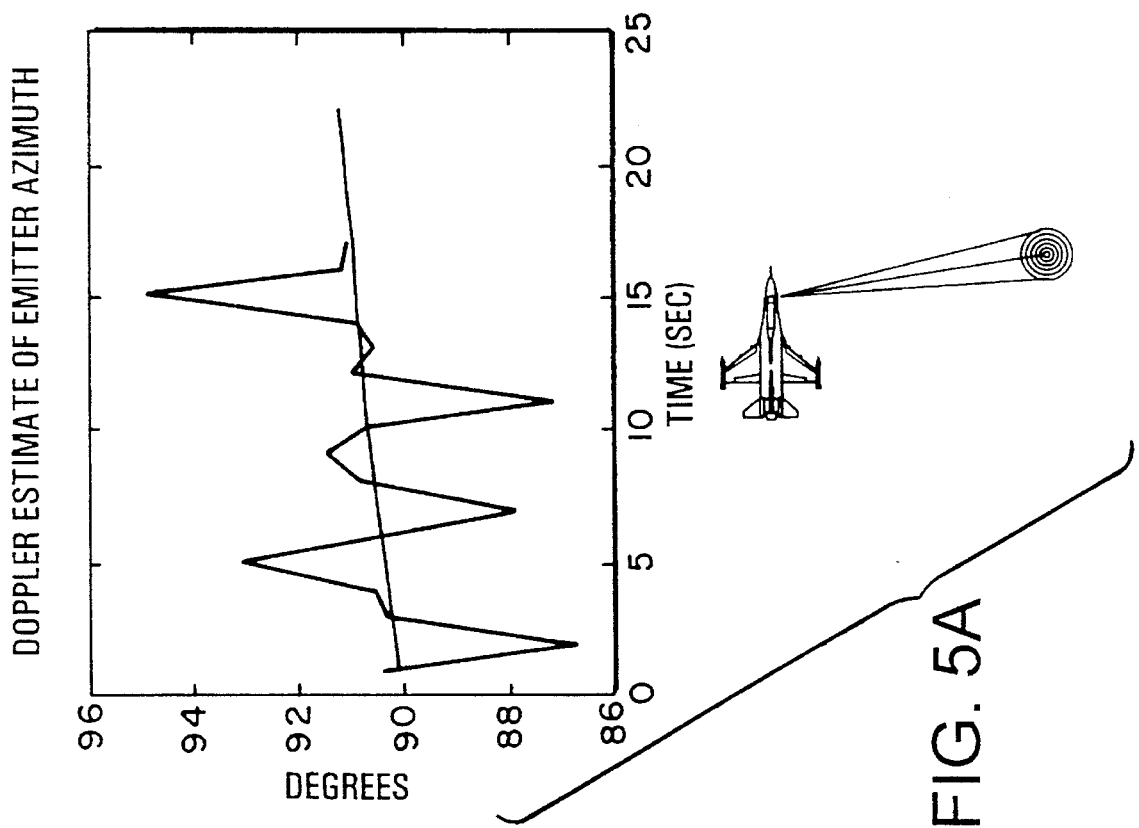
FIG. 5b demonstrates the breakdown in angle estimation performance when the principles of the invention and the FIG. 2 embodiment are used.

If a frequency Doppler DF technique such as that described in the patent to Tsui is used in conjunction with a time Doppler DF method, both will estimate the same erroneous angles since the spurious frequency changes are provided by the same signal generator 10. Therefore the presence of the signal 11 is not detectable by comparing time and frequency Doppler results. Furthermore, by varying the oscillator pulling control statistics 12, i.e. setting the correlation time v and choosing the proper distribution for a, effects consistent with multipath scattering will be seen by the observer. FIG. 5 illustrates this. In FIG. 5a Shaw's prior art time Doppler method was used to locate the emitter using simulated data from a radar model based on the system shown in FIG. 1. FIG. 5b illustrates the effect of making the modifications shown in FIG. 2. The spurious DF estimates are consistent with errors caused by multipath off the airframe of the observer, e.g. the wings.

The principles of this invention are discussed hereinabove by describing the construction and operation of a preferred embodiment. It is to be understood that the described embodiment and its operating characteristics can be modified or changed while remaining within the scope of the invention as defined by the appended claims.

I claim:

1. Apparatus for generating an emitter radar signal having characteristics for preventing the location of the emitter in range or bearing using Doppler techniques, comprising:

a first source of random control signals for setting the statistical characteristics of the emitter radar signal to simulate multipath pulse-on-pulse signal collisions, low signal to noise ratio or other signal degrading effects in the radar signal as received, a variable second frequency source for producing the emitter's pulse repetition frequency (PRF) responsive to said control signals, a third source of pulses with fixed integer spacings including means responsive to the PRF output of said second source for determining the interpulse time differences of the third source, a fourth voltage-control source of RF carrier signal for the emitter, the frequency of which is responsive to the output of said first source, means for scaling and converting the output of said first source to a voltage compatible with a control input of said fourth source according to the magnitudes determined by Equation 3 hereinabove to thereby produce the desired disruptive effect.

2. The apparatus described in claim 1 wherein said first source is programmable and drives said second and fourth sources with generalized random telegraph signal, the mean value and variance of which is chosen to equal the Doppler shift experienced by an observer proceeding at a predetermined nominal speed and bearing, said random telegraph signal having a correlation time chosen to be the Nyquist sampling rate corresponding to the largest bandwidth occurring over a passive Doppler estimation time interval in both the observer's angle estimator and location estimator.

3. The apparatus described in claim 1 wherein said first source is a programmable pulse generator which further comprises:

means for signalling the start of a pulse repetition interval (PRI) frame by a timing marker and means responsive to said timing marker for synchronizing changes in said first source output with the frame repetition interval (FRI) timing thereof.

4. The apparatus described in claim 1 wherein said first source is a programmable pulse generator and further comprising:

means for inserting a dead-time interval into a pulse sequence produced by said first source, said interval being of a duration that all pulses transmitted from the apparatus to a target return before any further change in frequency is applied to said second and fourth sources.

5. A method for varying a radar emitter signal to prevent location of the emitter using passive Doppler techniques, comprising the step of:

altering the radar emitter signal so that the effect of the alterations at a receiver cannot statistically be distinguished from common signal corrupting influences such as multipath, pulse-on-pulse collisions or low signal to noise ratio.

6. The method defined in claim 5 wherein said altering step is carried out by modulation both the frequency and PRI of the radar emitter with the same perturbing signal.

* * * * *